US012649457B2

(12) United States Patent
    Moerbe et al.

(10) Patent No.: US 12,649,457 B2
(45) Date of Patent: Jun. 9, 2026

(54) METHOD OF OPERATING A MOTOR VEHICLE, SYSTEM

(71) Applicant: Robert Bosch GmbH, Stuttgart (DE)

(72) Inventors: Matthias Moerbe, Ilsfeld-Helfenberg (DE); Christian Cosyns, Peine (DE); Florian Mayer, Yokohama (JP)

(73) Assignee: ROBERT BOSCH GMBH, Stuttgart (DE)

( * ) Notice: Subject to any disclaimer, the term of this patent is extended or adjusted under 35 U.S.C. 154(b) by 175 days.

(21) Appl. No.: 18/546,512

(22) PCT Filed: Feb. 22, 2022

(86) PCT No.: PCT/EP2022/054306
    § 371 (c)(1),
    (2) Date: Aug. 15, 2023

(87) PCT Pub. No.: WO2022/207188
    PCT Pub. Date: Oct. 6, 2022

(65) Prior Publication Data
    US 2024/0132055 A1    Apr. 25, 2024
    US 2024/0227783 A9    Jul. 11, 2024

(30) Foreign Application Priority Data

Mar. 29, 2021    (DE) ..................... 10 2021 203 112.9

(51) Int. Cl.
    B60W 30/045        (2012.01)
    A41D 1/00          (2018.01)
    (Continued)

(52) U.S. Cl.
    CPC .......... B60W 30/045 (2013.01); A41D 1/002 (2013.01); B60W 10/04 (2013.01);
    (Continued)

(58) Field of Classification Search
    CPC .... A41D 1/002; B60W 10/04; B60W 10/184; B60W 2050/146; B60W 2300/36;
    (Continued)

(56) References Cited

U.S. PATENT DOCUMENTS 9,952,046 B1 *    4/2018    Blacutt ................. B60W 40/08
10,124,768 B1 *    11/2018    Bocca .................... B60R 25/24
    (Continued)

FOREIGN PATENT DOCUMENTS

DE        102017200668 A1    7/2018
DE        102020203457 A1 *    10/2020    ............ B60W 30/09
    (Continued)

OTHER PUBLICATIONS

International Search Report for PCT/EP2022/054306, Issued Jul. 27, 2022.

*Primary Examiner* — Babar Sarwar
(74) *Attorney, Agent, or Firm* — NORTON ROSE FULBRIGHT US LLP

(57) ABSTRACT

A method for operating a motor vehicle. A deviation of a current driving position of a driver of the motor vehicle from an expected reference driving position of the driver is determined, and the motor vehicle is controlled depending on the determined deviation.

14 Claims, 2 Drawing Sheets

(51) Int. Cl.

| | |
|---|---|
| *B60W 10/04* | (2006.01) |
| *B60W 10/184* | (2012.01) |
| *B60W 50/14* | (2020.01) |
| *B62J 50/22* | (2020.01) |

(52) U.S. Cl.
CPC .......... *B60W 10/184* (2013.01); *B60W 50/14* (2013.01); *B62J 50/22* (2020.02); *B60W 2050/146* (2013.01); *B60W 2300/36* (2013.01); *B60W 2520/06* (2013.01); *B60W 2540/227* (2020.02); *B60W 2710/18* (2013.01)

(58) Field of Classification Search
CPC ....... B60W 2520/06; B60W 2540/223; B60W 2540/227; B60W 2556/45; B60W 2710/18; B60W 2720/106; B60W 2720/18; B60W 30/045; B60W 30/18; B60W 50/14; B60Y 2200/252; B62J 50/22
See application file for complete search history.

(56) References Cited

U.S. PATENT DOCUMENTS

| | | | | |
|---|---|---|---|---|
| 10,960,896 | B2 * | 3/2021 | Tsukada | B60T 7/22 |
| 11,321,951 | B1 * | 5/2022 | Chan | B60W 50/14 |
| 2014/0015662 | A1 * | 1/2014 | Oettgen | B60W 40/08 |
| | | | | 340/439 |
| 2017/0008591 | A1 * | 1/2017 | Abbott | B62K 5/08 |

| | | | | |
|---|---|---|---|---|
| 2017/0028971 | A1 * | 2/2017 | Kajiyama | B60T 8/3225 |
| 2017/0102547 | A1 * | 4/2017 | Wei | G02B 27/017 |
| 2017/0176591 | A1 * | 6/2017 | Pineda-Deom | G01S 13/931 |
| 2017/0236246 | A1 * | 8/2017 | Mrozek | G06T 1/20 |
| | | | | 345/522 |
| 2017/0236346 | A1 * | 8/2017 | Murar | G07C 9/00309 |
| | | | | 340/5.61 |
| 2017/0361814 | A1 | 12/2017 | Natoli et al. | |
| 2019/0300012 | A1 * | 10/2019 | Tsukada | B60T 8/1766 |
| 2020/0005566 | A1 * | 1/2020 | Jain | G07C 9/28 |
| 2020/0156605 | A1 * | 5/2020 | Hamm | G08G 1/166 |
| 2020/0172113 | A1 * | 6/2020 | Kim | G07C 5/085 |
| 2020/0302704 | A1 * | 9/2020 | Khanna | B62J 45/41 |
| 2021/0031856 | A1 * | 2/2021 | Calley | B62J 23/00 |
| 2021/0387690 | A1 * | 12/2021 | Allinger | B62J 45/416 |
| 2022/0203996 | A1 * | 6/2022 | Katz | B60W 50/14 |
| 2023/0356728 | A1 * | 11/2023 | Jain | G06F 3/013 |
| 2024/0199031 | A1 * | 6/2024 | Badouin | B60W 40/08 |

FOREIGN PATENT DOCUMENTS

| | | | | | |
|---|---|---|---|---|---|
| EP | 3260324 | A1 * | 12/2017 | | B60K 28/04 |
| EP | 3604097 | A1 * | 2/2020 | | B62K 21/00 |
| JP | 2017178284 | A | 10/2017 | | |
| JP | 2019172155 | A | 10/2019 | | |
| KR | 20190123904 | A | * | 11/2019 | B60R 21/01516 |
| RU | 2756256 | C1 | * | 9/2021 | G06F 18/00 |
| WO | WO-2012056558 | A1 | * | 5/2012 | G01B 7/16 |
| WO | 2018206418 | A1 | 11/2018 | | |
| WO | 2020002392 | A1 | 1/2020 | | |

* cited by examiner

METHOD OF OPERATING A MOTOR VEHICLE, SYSTEM

FIELD

The present invention relates to a method of operating a motor vehicle.

Furthermore, the present invention relates to a system comprising a motor vehicle.

BACKGROUND INFORMATION

In some conventional methods, a motor vehicle is selectively unlocked or locked depending on a current position of a user in the environment of the motor vehicle. Such a method is described, for example, in PCT Patent Application No. WO 2018 206 418 A1. In this conventional method, the current position of the user is determined by communication of an on-board communication means assembly with a user device associated with the user.

PCT Patent Application No. WO 2020 002 392 A1 describes a further method in which a motor vehicle is selectively unlocked or locked depending on the current position of the user in the environment of the motor vehicle.

SUMMARY

The present invention provides a method of operating a motor vehicle. In the method according to an example embodiment of the present invention, a deviation of a current driving position of a driver of the motor vehicle from an expected reference driving position of the driver is determined, and the motor vehicle is controlled as a function of the determined deviation. Thus, at least one element of the motor vehicle is controlled as a function of the deviation. For example, the control of the motor vehicle is changed or adapted if the deviation exceeds a predefined threshold value. In the context of the disclosure, the current driving position means the current position of a body part of the driver while driving the motor vehicle. Accordingly, the expected reference driving position is to be understood as the position that the body part in question usually assumes while the driver is driving the motor vehicle. The present invention is based on the knowledge that, for example, driving safety and/or driving comfort can be increased by the procedure according to the present invention. Preferably, a distance between the current driving position and the reference driving position is determined as the deviation. For example, if the current driving position of the driver is determined to be the current position of the driver's head while driving, the deviation is then the distance between the current position of the head and the expected reference driving position of the head. Preferably, a distance between the current driving position and the reference driving position in a predefined direction is determined as the deviation, for example the distance in the longitudinal axis direction of the motor vehicle. This allows the control of the motor vehicle to be adjusted particularly precisely. Preferably, a specific current driving position is selected and used as a reference driving position for determining the deviation. For example, the current driving position is selected immediately after the start of the drive, or at least substantially immediately after the start of the drive. Alternatively, a driving position is preferably selected as the reference driving position that the driver assumes in a predefined driving situation, for example when driving straight ahead at a predefined speed. Preferably, the motor vehicle is configured as a motorcycle, quad bike, snowmobile, or jet ski. The advantages described above and below are particularly pronounced in such motor vehicles.

According to a preferred embodiment of the present invention, it is provided that a drive device, a braking device, a display device, and/or a communication module of the motor vehicle are controlled as a function of the determined deviation. By controlling these elements of the motor vehicle as a function of the determined deviation, the advantages listed above can be achieved.

Preferably, according to an example embodiment of the present invention, the current driving position is determined by determining a current position of a user device associated with the driver. The user device is, for example, a smartwatch or smartphone of the driver. The position of such a user device is usually constant relative to the driver while driving, because the driver usually keeps or carries the user devices in the same place while driving. In this respect, the position of the user device corresponds to the position of a certain part of the driver's body. In addition, the current position of such user devices is technically easy to detect, for example, by means of an on-board communication means assembly. The current position of the user device is then determined, for example, as a function of a time difference between transmission of a signal by the user device and reception of the transmitted signal by the communication means of the communication means assembly.

According to a preferred embodiment of the present invention, when it is determined that the current driving position in the forward driving direction of the motor vehicle is behind the reference driving position, the drive device is controlled in such a way that a drive torque provided by the drive device is reduced or limited. If the current driving position in the forward driving direction is behind the reference driving position, increasing the currently provided drive torque or maintaining an already high currently provided drive torque could cause the driver to lose his balance. This is avoided by reducing or limiting the drive torque. Preferably, when it is determined that the current driving position is above the reference driving position, the drive device is controlled in such a way that a drive torque provided by the drive device is reduced or limited. If the current driving position is above the reference driving position, it can be assumed that the driver is driving while standing. In this case, too, a high drive torque could cause the driver to lose their balance.

According to a preferred embodiment of the present invention, when it is determined that the current driving position in the forward driving direction of the motor vehicle is ahead of the reference driving position, the braking device is controlled in such a way that a braking torque provided by the braking device is reduced or limited. If the current driving position in the forward driving direction is ahead of the reference driving position, increasing the currently provided braking torque or maintaining an already high currently provided braking torque could cause the driver to lose their balance. This is avoided by reducing or limiting the braking torque. Preferably, when it is determined that the current travel position is above the reference travel position, the braking device is controlled in such a way that a drive torque provided by the drive device is reduced or limited. According to a preferred embodiment of the present invention, it is provided that a cornering technique currently used by the driver is determined as a function of the deviation on the one hand and a lean angle of the motor vehicle on the other, and that the motor vehicle is controlled as a function of the determined cornering technique. According to this embodiment, the motor vehicle is preferably configured as a single-track motor vehicle. In the case of single-track motor vehicles, a basic distinction is made between the cornering techniques of "laying", "pushing," and "hanging off." Basically, the lean angle of the motor vehicle is used to detect whether a curve is being driven or not. If the driver uses the "laying" cornering technique, the vertical axis of the motor vehicle is in the sagittal plane of the driver and the current driving position corresponds to the reference driving position. Thus, it is determined that the driver uses the "laying" cornering technique when the lean angle exceeds a predefined threshold and the deviation falls below a predefined threshold. If the driver uses the "pushing" cornering technique, the driver pushes the motor vehicle into the necessary inclined position while remaining upright himself relative to the road, so that an angle is formed between the vertical axis of the motor vehicle and the sagittal plane of the driver. This angle is accompanied by a deviation between the current driving position and the reference driving position. If the driver uses the "hanging off" cornering technique, the driver leans his body from the center of the vehicle toward the inside of the curve. In this case, too, an angle is formed between the vertical axis of the motor vehicle and the sagittal plane of the driver. This angle is accompanied by a different deviation between the current driving position and the reference driving position than when using the "pushing" cornering technique.

Preferably, according to an example embodiment of the present invention, at least one assistance system of the motor vehicle is selectively enabled or disabled depending on the determined cornering technique. This is also understood to mean controlling the motor vehicle. For example, the assistance system is disabled when determining that the driver is using the "hanging off" cornering technique. The intervention of an assistance system would be unexpected or undesirable for the driver, particularly in the case of the "hanging off" cornering technique. For example, the ACC (Adaptive Cruise Control) assistance system and/or the AEB (Automatic Emergency Brake) assistance system are disabled.

According to a preferred embodiment of the present invention, it is provided that a display device of the motor vehicle and/or a communication module of the motor vehicle are controlled in such a way that the display device and/or the communication module provide the driver with information regarding the determined cornering technique. This is also understood to mean controlling the motor vehicle. For example, the driver is provided with information to the effect that his cornering technique deviates from an optimum cornering technique or to what extent his cornering technique deviates from an optimum cornering technique. A driving instructor function is therefore provided in the broadest sense.

The system according to an example embodiment of the present invention features a motor vehicle, at least one vehicle communication means (i.e., arrangement) arranged on the motor vehicle, at least one user device that can be handled separately from the motor vehicle and is assigned to a driver of the motor vehicle, and an evaluation device. In the system according to the present invention, the vehicle communication means is configured to receive signals transmitted by the user device, and in that the evaluation device is configured to determine a deviation of a current driving position of the driver from an expected reference driving position of the driver as a function of the received signals. This also results in the advantages already mentioned. For example, the control of the motor vehicle can be adjusted or changed depending on the determined deviation. In addition, information regarding a driver's driving style can be determined and provided to the driver based on the deviation. Further preferred features and combinations of features result from the disclosure herein.

Preferably, according to an example embodiment of the present invention, the system features a control device for actuating the motor vehicle, the control device being configured to control the motor vehicle as a function of the determined deviation. For example, the control device is configured to control a drive device, a brake device, a display device and/or a communication module of the motor vehicle as a function of the determined deviation.

Preferably, according to an example embodiment of the present invention, the system features at least one further vehicle communication means (i.e., arrangement), wherein the vehicle communication means and the further vehicle communication means are arranged at a distance from each other on the motor vehicle. By having two vehicle communication means spaced apart from each other, a distance in a certain direction can be determined as a deviation. Depending on such a deviation, the control of the motor vehicle can be adjusted or changed particularly precisely. For example, one of the vehicle communication means is arranged in the region of a front end of the motor vehicle and the other vehicle communication means is arranged in the region of a rear end of the motor vehicle. With such an arrangement, a distance in the direction of the longitudinal axis can be determined as the deviation. Alternatively, the two vehicle communication means are located at different ends of a steering handle of the motor vehicle. With such an arrangement, a distance in the transverse axis direction of the motor vehicle can be determined as the deviation. According to another embodiment, the system features only a single vehicle communication means. By a single vehicle communication means, a distance from the vehicle communication means can be determined as a deviation. Preferably, the position of the vehicle communication means serves as the reference driving position.

According to a preferred embodiment of the system of the present invention, it is provided that at least one of the vehicle communication means is configured as a Bluetooth Low Energy (BLE) module, and/or that at least one of the vehicle communication means is configured as an ultra-wideband (UWB) module. Communication means configured in this way allow the deviation to be determined particularly precisely. For example, a UWB module allows a deviation to be determined with an error of a few centimeters or less. Particularly preferably, one of the vehicle communication means is configured as a BLE module and the other as a UWB module.

Preferably, according to an example embodiment of the present invention, the user device is configured as a smartphone or a smartwatch. These devices are particularly suitable as a user device because they already have the necessary communication means to emit signals that can be detected by the vehicle communication means. In addition, the position of a driver's smartphone or a driver's smartwatch is typically constant relative to a particular part of the driver's body while driving.

Preferably, according to an example embodiment of the present invention, the user device is integrated into a piece of clothing for the driver. This also ensures that the position of the user device is constant relative to a specific part of the driver's body while driving. For example, the garment is a driving suit, glove, jacket, or safety helmet.

According to a preferred embodiment of the present invention, the system features at least one further user device, wherein the user device and the further user device are integrated into respective different sleeves of the garment. In such an embodiment, the current driving position of both hands of the driver can be monitored particularly precisely. In this respect, it can be checked whether the driver's hands are actually on the steering handle while driving. Preferably, a current driving position and a deviation from a reference driving position are determined for each of the user devices. Preferably, according to this embodiment, the system features two vehicle communication means, each attached to a different end of the steering handle. If, depending on the deviation or deviations, it is determined that the driver is holding the steering handle with only one hand or with no hand, the control device preferably controls a drive device of the motor vehicle in such a way that the drive torque provided by the drive device is reduced or limited. Alternatively or additionally, the control device preferably controls a braking device of the motor vehicle in such a way that the braking torque provided by the braking device is reduced or limited.

According to a preferred embodiment of the present invention, it is provided that the motor vehicle is configured as a motorcycle, quad, snowmobile, or jet ski. In such motor vehicles, the advantages achieved by the system are particularly pronounced.

The present invention is explained in more detail below with reference to the figures.

BRIEF DESCRIPTION OF THE DRAWINGS

FIG. 1 shows a system 1. The system 1 features a motor vehicle 2. In the present case, the motor vehicle 2 is a motorcycle 2. According to another exemplary embodiment, the motor vehicle 2 is, for example, a quad bike, a snowmobile, or a jet ski.

Figure 1:
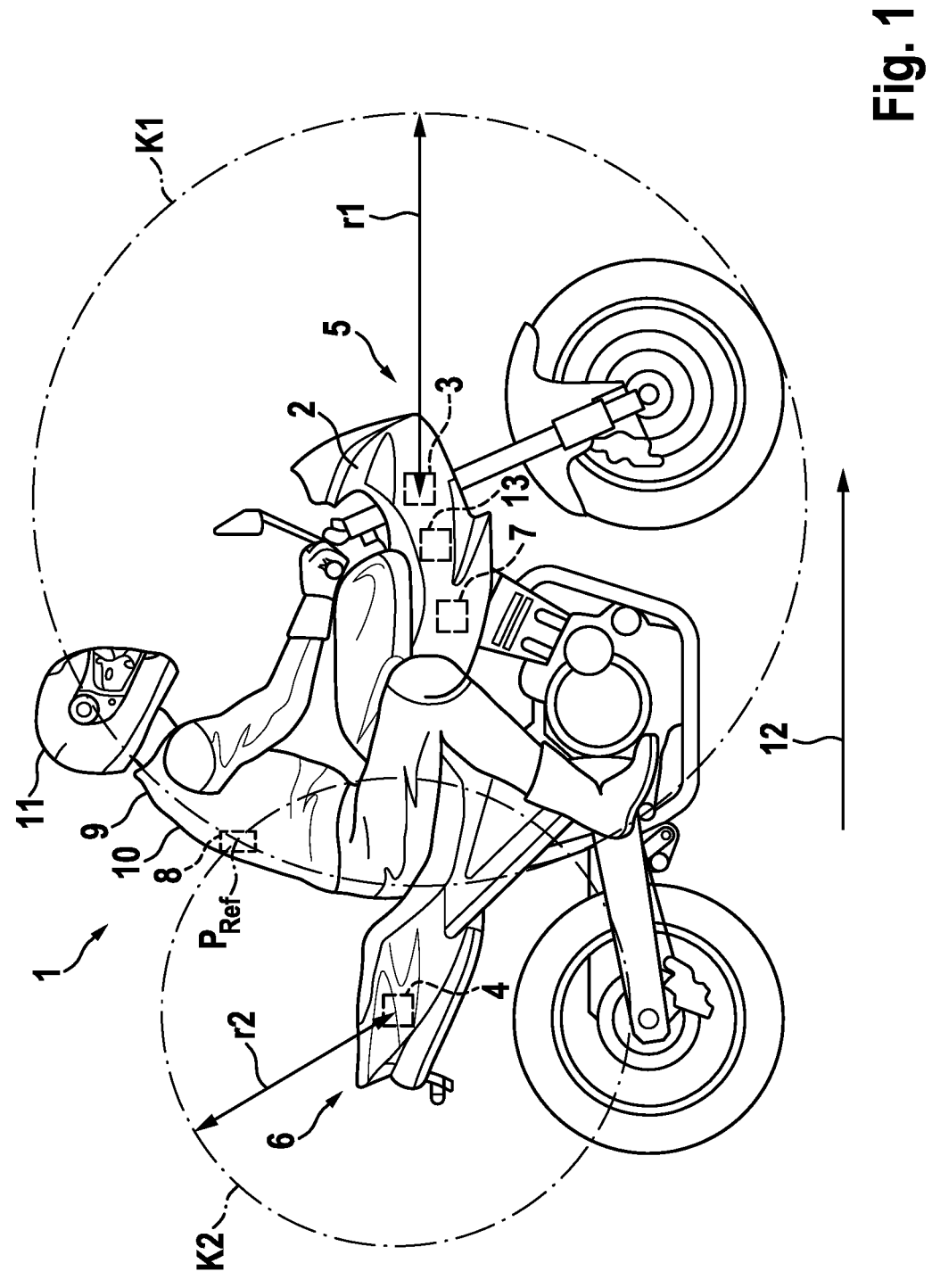
FIG. 1 shows a system for operating a motor vehicle, according to an example embodiment of the present invention.

The system 1 features a first vehicle communication means (i.e., arrangement) 3 arranged on the motor vehicle 2. The system 1 further features a second vehicle communication means 4 arranged at a distance from the first vehicle communication means 3 on the motor vehicle 2. In the present case, the first vehicle communication means 3 is arranged in the region of a front end 5 of the motor vehicle 2. The second vehicle communication means (i.e., arrangement) 4 is arranged in the region of a rear end 6 of the motor vehicle 2.

The vehicle communication means 3 and 4 are configured, for example, as a BLE module or a UWB module. According to a particularly preferred exemplary embodiment, one of the vehicle communication means 3 and 4 is configured as a BLE module and the other of the vehicle communication means 3 or 4 is designed as a UWB module.

The system 1 also features an evaluation device 13. The evaluation device 13 is connected to the vehicle communication means 3 and 4 by means of communication technology.

The system 1 also features a control device 7. The control device 7 is configured to control one or more elements of the motor vehicle 2. For example, the control device 7 is configured to control a drive device, a brake device, a display device, and/or a communication module of the motor vehicle 2. The communication module is, for example, one of the vehicle communication means 3 and 4.

The system 1 further features at least one user device 8, which can be handled separately from the motor vehicle 2 and is associated with a driver 9 of the motor vehicle 2. In the present case, a single user device 8 is present, which is integrated into a driving suit 10 of the driver 9 in the area of the driver's back 9. According to another exemplary embodiment, the user device 8 is configured as a smartphone or a smartwatch, for example.

The user device 8 is configured to emit signals. The vehicle communication means 3 and 4 are configured to receive signals transmitted by the user device 8.

The evaluation device 13 is configured to determine a deviation of a current driving position of the driver 9 from an expected reference driving position PR e f as a function of the signals received by the vehicle communication means 3 and 4. Because the user device 8 is integrated into the driving suit 10 of the driver 9 in the area of the back of the driver 9, the position of the user device 8 relative to the back of the driver 9 is at least substantially constant during a journey of the driver 9 with the motor vehicle 2. Accordingly, the current position of the user device 8 corresponds at least substantially to the current driving position of the driver's back 9 due to its placement. According to the exemplary embodiment shown in FIG. 1, the current position of the user device 8 corresponds to the reference driving position PR e f. Thus, the position of the driver 9 on the motor vehicle 2 corresponds to the expected position.

Figure 2:
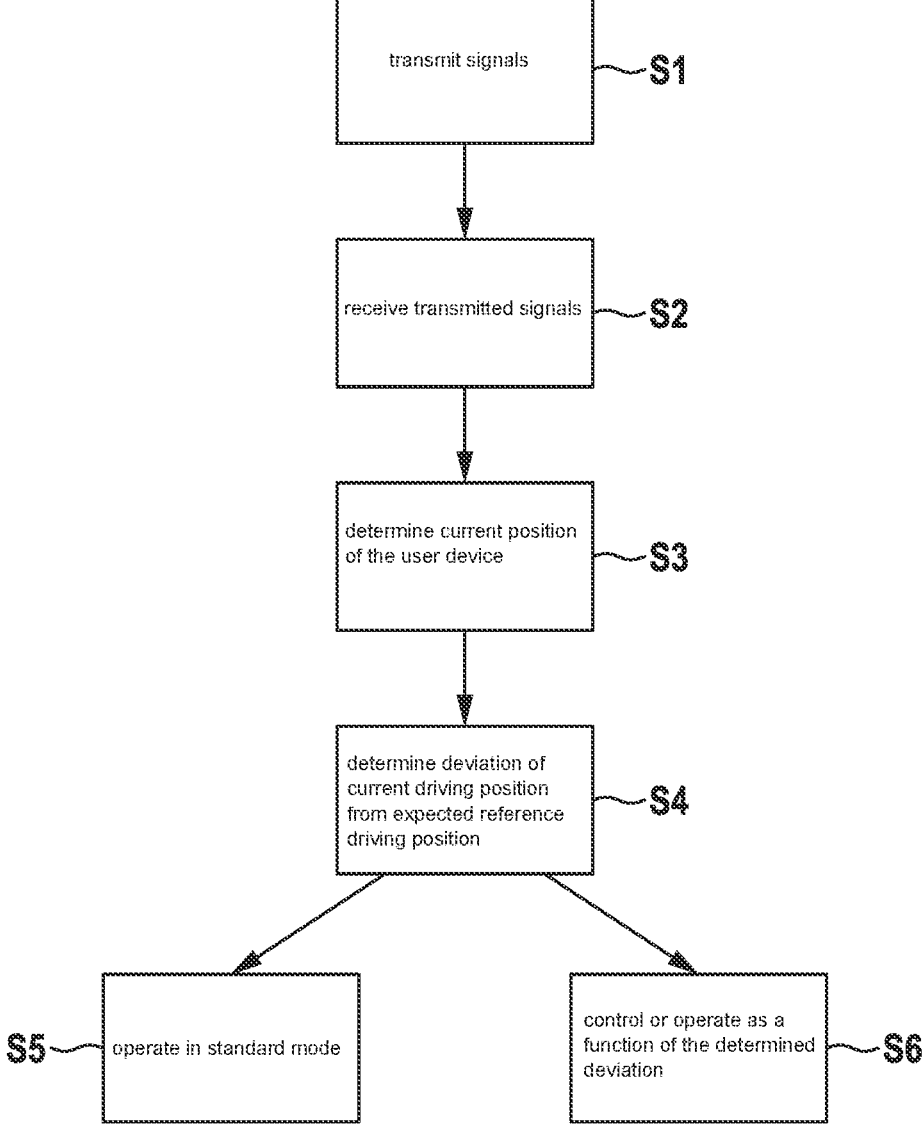
FIG. 2 shows a method of operating the motor vehicle, according to an example embodiment of the present invention.

The control device 7 is configured to control the motor vehicle 2 as a function of the determined deviation. This is explained in more detail below with reference to FIG. 2. This figure shows a method of operating the motor vehicle 2 using a flowchart.

In a first step S1, the user device 8 transmits signals receivable by the vehicle communication means 3 and 4. If the vehicle communication means 3 and 4 are configured as BLE modules, the user device 8 transmits Bluetooth signals. If the vehicle communication means 3 and 4 are configured as UWB modules, the user equipment 8 transmits ultrawideband signals. If one of the vehicle communication means is configured as a BLE module and the other is a UWB module, the user device 8 transmits both Bluetooth signals and ultra-wideband signals.

In a second step S2, the transmitted signals are received by the vehicle communication means 3 and 4 and provided to the evaluation device 13. For this purpose, the vehicle communication means 3 and 4 are connected to the evaluation device 13 by wireless or wired communication.

In a third step S3, the evaluation device 13 determines the current position of the user device 8 and thus the current driving position of the back of the driver 9. For example, the evaluation device 13 determines the current driving position as a function of the travel times of the received signals. According to the exemplary embodiment shown in FIG. 1, there are two vehicle communication means 3 and 4. In this respect, determining the current position of the user device 8 is not unambiguous. The propagation time of the signal before reception by the first vehicle communication means 3 corresponds to a distance r1 between the user device 8 and the first vehicle communication means 3. In this respect, the current position of the user device 8 is on an outer surface of a sphere K1, wherein the center of the sphere K1 is the first vehicle communication means 3, and wherein the radius of the sphere K1 is the distance r1. The propagation time of the signal before reception by the second vehicle communication means 4 corresponds to a distance r2 between the user device 8 and the second vehicle communication means 4. In this respect, the current position of the user device 8 is on an outer surface of a sphere K2, wherein the center of the sphere K2 is the second vehicle communication means 4, and wherein the radius of the sphere K2 is the distance r2. Accordingly, an intersection circle describing various possible positions is obtained as the current driving position. This intersection circle is oriented at least substantially perpendicular to the longitudinal axis of the motor vehicle 2 and perpendicular to the forward travel direction 12, respectively, due to the arrangement of the vehicle communication means 3 and 4.

In a fourth step S4, the evaluation device 13 determines a deviation of the current driving position determined in step S3 from the expected reference driving position $P_{Ref}$. The reference driving position $P_{Ref}$ is the driving position that the driver 9 or the relevant body part of the driver 9 usually assumes when driving the motor vehicle 2. In the present case, the evaluation device 13 determines as a deviation a distance of the current driving position from the reference driving position PR e f in the direction of the longitudinal axis. Because the aforementioned intersection circle is oriented at least substantially perpendicular to the longitudinal axis, the determined deviation is unambiguous.

If the deviation falls below a predefined threshold value, reference is made to a fifth step S5. In the fifth step S5, the motor vehicle 2 is then operated in a standard mode. This is the case, for example, with the current driving position according to FIG. 1. In the exemplary embodiment shown in FIG. 1, the current driving position corresponds to the reference driving position $P_{Ref}$.

However, if the deviation exceeds the threshold value, reference is made to a sixth step S6. In the sixth step S6, the motor vehicle 2 is then controlled or operated as a function of the determined deviation.

If the evaluation device 13 determines, for example, on the basis of the determined deviation that the current driving position in the forward travel direction 12 of the motor vehicle 2 is behind the reference driving position P Ref by more than the threshold value, the control device 7 controls the drive device of the motor vehicle 2 in step S6 in such a way that a drive torque provided by the drive device is reduced or limited.

Increasing the drive torque or maintaining an already high drive torque could otherwise cause the driver 9 to lose his balance.

However, if the evaluation device 13 determines on the basis of the deviation that the current driving position in the forward driving direction of the motor vehicle 2 is ahead of the reference driving position PR e f by more than the threshold value, the control device 7 controls the braking device of the motor vehicle 2 in step S6 in such a way that a braking torque provided by the braking device is reduced or limited. Otherwise, the driver 9 could lose his balance by increasing the braking torque or maintaining an already high braking torque.

According to another exemplary embodiment of the system 1, the vehicle communication means 3 and 4 are arranged at respective different ends of a steering handle of the motor vehicle 2.

With such an arrangement, a distance in the transverse axis direction of the motor vehicle 2 can be uniquely determined as a deviation. In addition, in this exemplary embodiment, a cornering technique currently used by the driver 9 can be determined as a function of an oblique angular position of the motor vehicle 2 on the one hand and the deviation, i.e., the distance in the transverse axis direction, on the other hand.

If the evaluation device 13 determines on the basis of the deviation and the oblique angle position that the driver 9 is currently using the "hanging off" cornering technique, assistance systems of the motor vehicle 2 are disabled by the control device 7 in step S6.

According to another exemplary embodiment, the system 1 features two user devices, wherein a first of the user devices is integrated into a first sleeve of the driving suit 10, and wherein a second of the user devices is integrated into a second sleeve of the driving suit 10. Also in this embodiment, the vehicle communication means 3 and 4 are preferably arranged at the ends of the steering handle.

In such an embodiment of the system 1, it can be determined, for example, whether the driver 9 grips the steering handle with both hands while driving. For this purpose, a current driving position is determined for each of the user devices and compared with a respective reference driving position. Preferably, one of the vehicle communication means 3 and 4 is associated with one of the user devices and the reference travel position for this user device corresponds to the position of this vehicle communication means 3 or 4. The other of the vehicle communication means 3 and 4 is then associated with the other of the user devices, and the reference driving position for that user device corresponds to the position of the other vehicle communication means 3 or 4.

If it is determined on the basis of the detected deviations that the driver has only one hand or no hand on the steering handle, the control device 7 controls the drive device in step S6 in such a way that the drive torque provided is reduced or limited. In addition, the control device 7 controls the braking device in such a way that the braking torque provided is reduced or limited.

The invention claimed is:

1. A method for operating a motor vehicle, the method comprising the following steps:

determining a deviation of a current driving position of a driver of the motor vehicle from an expected reference driving position of the driver; and controlling the motor vehicle as a function of the determined deviation, wherein the deviation is a distance between a current driving position of a body part of the driver and an expected reference driving position of the body part, and the deviation is determined in a predefined direction of the motor vehicle.

2. The method according to claim 1, wherein a drive device of the motor vehicle, and/or a brake device of the motor vehicle, and/or a display device of the motor vehicle, and/or a communication module of the motor vehicle, is controlled as a function of the determined deviation.

3. The method according to claim 1, wherein the current driving position is determined by determining a current position of a user device assigned to the driver.

4. The method according to claim 1, wherein, based on determining that the current driving position in a forward travel direction of the motor vehicle is behind the reference driving position, a drive device of the motor vehicle is controlled in such a way that a drive torque provided by the drive device is reduced or limited.

5. The method according to claim 1, wherein, based on determining that the current driving position in a forward travel direction of the motor vehicle is ahead of the reference driving position, a braking device of the motor vehicle is controlled in such a way that a braking torque provided by the braking device is reduced or limited.

6. The method according to claim 1, wherein a cornering technique currently used by the driver is determined as a function of the deviation and a lean angle of the motor vehicle, and the motor vehicle is controlled as a function of the determined cornering technique.

7. The method according to claim 6, wherein at least one assistance system of the motor vehicle is selectively enabled or disabled as a function of the determined cornering technique.

8. The method according to claim 6, wherein a display device of the motor vehicle and/or a communication module of the motor vehicle, is controlled in such a way that the display device and/or the communication module provide the driver with information relating to the determined cornering technique.

9. A system with a motor vehicle, comprising:
at least one vehicle communicator arranged on the motor vehicle;
at least one user device that can be operated separately from the motor vehicle and is assigned to a driver of the motor vehicle;
an evaluation device;
wherein the vehicle communicator configured to receive signals transmitted by the user device, and the evaluation device is configured to, depending on the received signals, determine a deviation of a current driving position of the driver from an expected reference driving position of the driver;
a control device configured to control the motor vehicle, the control device being configured to control the motor vehicle as a function of the determined deviation,
wherein the deviation is a distance between a current driving position of a body part of the driver and an expected reference driving position of the body part, and the deviation is determined in a predefined direction of the motor vehicle.

10. The system according to claim 9, further comprising:
at least one further vehicle communicator, wherein the vehicle communicator and the further vehicle communicator are arranged spaced apart from each other on the motor vehicle.

11. The system according to claim 9, wherein at least one of the at least one communicator is configured as a Bluetooth low energy module (BLE module), and/or at least one of the at least one vehicle communicator is configured as an ultra-wideband module (UWB module).

12. The system according to claim 9, wherein the user device is a smartphone or as a smartwatch.

13. The system according to claim 9, wherein the user device is integrated into a garment for the driver.

14. The system according to claim 13, further comprising:
at least one further user device, wherein the user device and the further user device are integrated into respective different sleeves of the garment.

* * * * *